United States Patent
Poor et al.

[11] Patent Number: 5,087,274
[45] Date of Patent: Feb. 11, 1992

[54] BAG SHAKER

[75] Inventors: James C. Poor, East Granby; Frederick K. Hoskins, Vernon; William Morcom, West Hartford, all of Conn.

[73] Assignee: The Spencer Turbine Company, Windsor, Conn.

[21] Appl. No.: 553,869

[22] Filed: Jul. 16, 1990

[51] Int. Cl.⁵ ............................................ B01D 41/00
[52] U.S. Cl. .................................... 55/300; 55/304; 55/305; 55/341.1
[58] Field of Search ............... 55/300, 301, 304, 305, 55/341.1

[56] References Cited

U.S. PATENT DOCUMENTS

| | | | |
|---|---|---|---|
| 842,529 | 1/1907 | Dittman | 55/250 |
| 1,286,458 | 12/1918 | Warren | 55/300 |
| 1,601,148 | 9/1926 | Ruemelin | 55/324 |
| 1,628,601 | 5/1927 | Feind | 55/96 |
| 1,835,093 | 12/1931 | Ruemelin | 55/305 |
| 1,856,133 | 5/1932 | McClatchie | 15/352 |
| 2,057,578 | 10/1936 | Kleissler | 55/305 |
| 2,612,236 | 9/1952 | Veder | 55/304 |
| 2,667,233 | 1/1954 | Vedder | 55/304 |
| 2,830,676 | 4/1958 | Schneider | 55/304 |
| 3,395,519 | 8/1968 | Kleissler | 55/304 |
| 3,550,358 | 12/1970 | McCabe | 55/305 |
| 3,577,705 | 5/1971 | Sharlit | 55/4 |
| 3,955,947 | 11/1974 | Hoon et al. | 55/300 |
| 4,242,114 | 12/1980 | Deacon | 55/304 |
| 4,383,840 | 5/1983 | Jones | 55/283 |
| 4,618,353 | 10/1986 | Reier | 55/304 |
| 4,874,410 | 10/1989 | Poor | 55/341.2 |

Primary Examiner—Jay H. Woo
Assistant Examiner—C. Scott Bushey
Attorney, Agent, or Firm—McCormick, Paulding & Huber

[57] ABSTRACT

A bag separator having a bag housing containing a moveable bag head supporting a plurality of depending filter bags includes a bag shaker which may be readily provided for either manual or power operation. Parts of the shaker mechanism are common to both the manually operated bag shaker and the power driven bag shaker so that a manually operated bag shaker may be easily retrofitted for power operation.

2 Claims, 2 Drawing Sheets

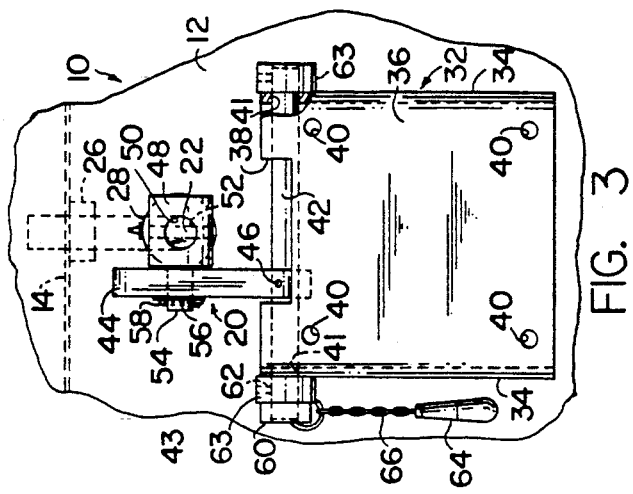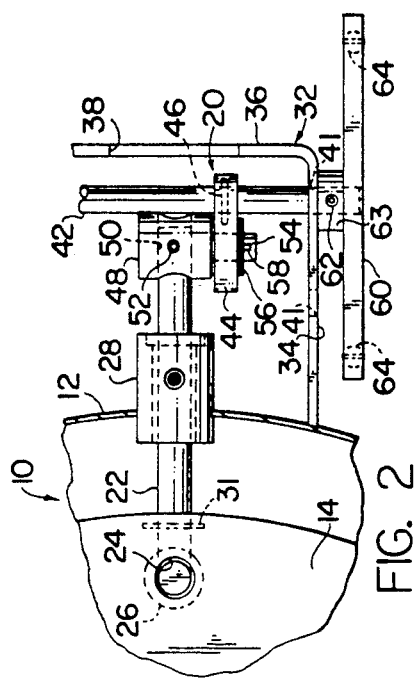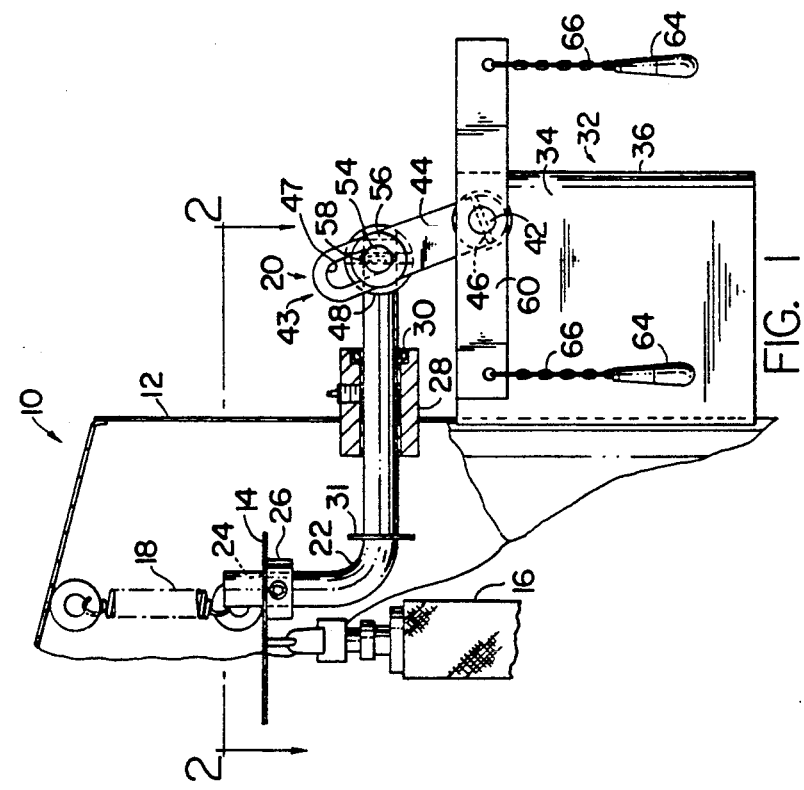

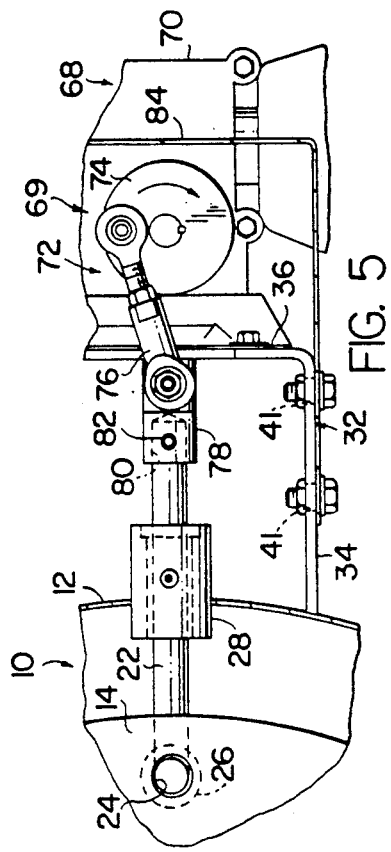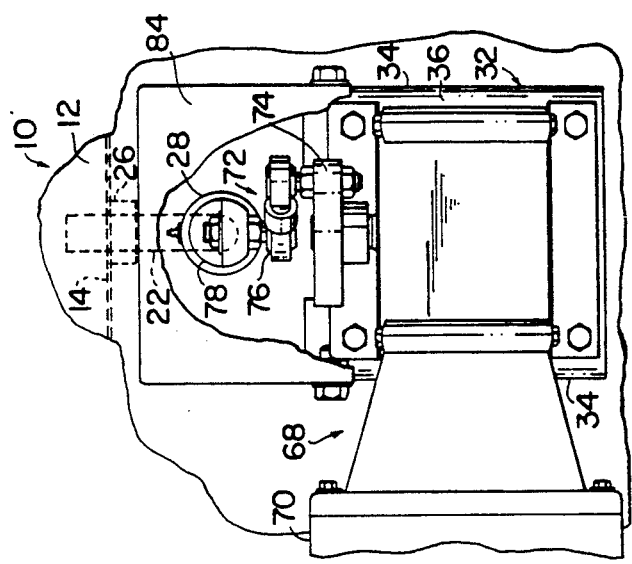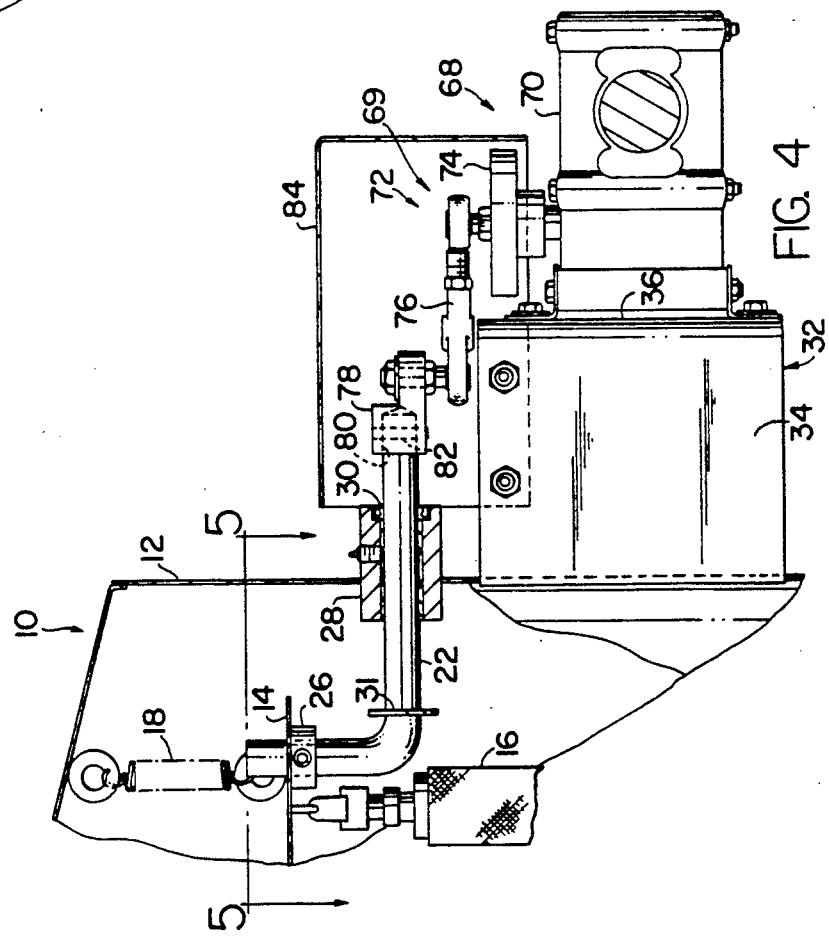

BAG SHAKER

BACKGROUND OF THE INVENTION

This invention relates in general to dust collectors and deals more particularly with improvements in bag separators of the type having a housing containing a moveable bag head supporting a plurality of depending filter bags and including a bag shaker for periodically agitating the bag head to dislodge dust or other particulate material from the filter bags. The bag shakers used with bag separators of the aforedescribed general type are customarily specifically designed for either manual or power operation. Typical examples of both types of bag shakers are found in the following U.S. Pat. Nos.

842,529
1,601,148
1,628,601
1,856,133
3,577,705
3,955,947
4,383,840

Heretofore, manually operated bag shaker mechanisms have differed substantially from power operated ones so that conversion of a bag shaker mechanism from manual operation to power operation has required substantial modification of the associated bag separator. The present invention is primarily concerned with this problem.

It is the general aim of the present invention to provide an improved bag shaker which may be readily furnished with either a manually operated or power operated bag shaker mechanism and which may be easily upgraded or retrofitted for power operation from manual operation by a person possessing ordinary skills and using readily available hand tools.

SUMMARY OF THE INVENTION

In accordance with the present invention, an improved bag shaker is provided for a bag separator having a housing containing a moveable bag head for supporting a plurality of depending filter bags, and agitating means for shaking the filter bags to dislodge dust and other particulate material therefrom. The bag separator includes a bag shaker rod attached to the bag head within the housing and extending outwardly through and beyond a wall of the housing and terminating at an outer end, a bushing mounted on the wall of the housing receiving the bag shaker rod therethrough and supporting it for reciprocal sliding movement relative to the housing, and a support bracket secured in fixed position to and externally of the housing. The operating mechanism for reciprocating the bag shaker rod is selected from a group of operating mechanisms which include a manual operating mechanism and a power driven operating mechanism. The selected operating mechanism has a part thereof mounted on the support bracket and includes a connecting member for attachment to the outer end portion of the bag shaker rod to reciprocate the rod in response to operation of the selected operating mechanism.

BRIEF DESCRIPTION OF THE DRAWINGS

FIG. 1 is a fragmentary side elevational view of a bag separator shown partially in vertical axial section, embodying the present invention and having a manually operated bag shaker mechanism.

FIG. 2 is a fragmentary sectional view taken along the line 2—2 of FIG. 1.

FIG. 3 is a fragmentary front elevational view of the bag separator and shaker mechanism shown in FIGS. 1 and 2.

FIG. 4 is a fragmentary side elevational view of the bag separator of FIG. 1-3 shown retrofitted with a power operated bag shaker mechanism.

FIG. 5 is a fragmentary sectional view taken along the line 5—5 of FIG. 4.

FIG. 6 is a fragmentary front elevational view of the bag separator and power operated shaker mechanism shown in FIGS. 4 and 5, a portion of the guard cover on the bag shaker mechanism shown broken away to reveal structure therebehind.

DETAILED DESCRIPTION OF PREFERRED EMBODIMENT

In the drawings and in the description which follows the present invention is illustrated and described with reference to a bag separator of a well known type indicated generally by the reference numeral 10. The illustrated bag separator 10 has a generally cylindrical housing 12 which contains a horizontally disposed moveable bag head 14 supporting a plurality of depending filter bags 16 (one shown). The bag head 14 is suspended from the top wall of the housing by a plurality of springs 18,18 (one shown) for movement relative to the housing in a manner well known in the bag separator art. A typical bag separator of the type with which the present invention is concerned is illustrated and described in U.S. Pat. No. 4,874,410 to Poor, entitled Vacuum Producing Apparatus, and assigned to the assignee of the present invention. The aforesaid patent is hereby adopted by reference as a part of the present disclosure.

In accordance with the present invention a bag separator, such as the illustrated bag separator 10, may be readily furnished to a customer with either a manually operated or power driven bag shaker operating mechanism. A customer who selects a bag separator having a manually operated shaker mechanism has the option of upgrading the bag separator for power operation at a later date and at minimal cost, all of which will be apparent from the further description which follows.

Referring now particularly to FIGS. 1-3, the illustrated bag separator 10 is shown equipped with a manually operable bag shaker, designated generally by the numeral 20. Considering the bag shaker 20 in further detail, it includes a generally L-shaped bag shaker rod 22 having a vertically extending leg, the upper end portion of which is loosely received within and extends upwardly through a collar 26, tack welded or otherwise secured to the bag head, and through an opening 24 in the bag head 14, substantially as shown. The lower or horizontally extending leg of the L-shaped shaker rod 22 is slidably received in and extends outwardly through and beyond a bushing assembly 28 mounted in fixed position on a sidewall of the housing 12 and terminates at an outer end. Preferably, and as shown, the bushing assembly 28 includes an annular seal 30 which surrounds an associated portion of the rod 22 to prevent air from entering the plenum chamber defined by the housing 12. A washer 31 welded or otherwise secured in fixed position to the horizontal leg of the shaker rod 22 serves as a stop to prevent the curved portion of the rod from entering and becoming jammed within the bushing assembly 28.

The illustrated bag shaker 20 further includes a support bracket, indicated generally at 32, secured externally of the housing 12 in fixed position to the sidewall thereof by welding or using other suitable fastening means. The mounting bracket 32 has a generally U-shaped cross-section as viewed from above and includes a pair of opposing sidewalls 34,34 and a generally rectangular end wall 36. The end wall 36 has an upwardly open notch 38 formed in the upper end thereof. A plurality of mounting holes 40,40 are formed in the end wall 36 below the notch 38 and additional apertures 41,41 are formed in the sidewalls 34,34 for reasons which will be hereinafter further evident.

A manual operable shaker operating mechanism, indicated generally at 43 and illustrated in FIGS. 1-3, includes an axially horizontal rock shaft 42 journalled in and extending through associated apertures 41,41 in the opposing sidewalls 34,34 and which comprises a part of the mechanism. A crank arm 44 is secured in fixed position to the rock shaft 42 between the sidewalls 34,34 by a roll pin 46 and has a slot 47 formed therein, as shown in FIG. 1. Connection between the crank arm 44 and the outer end portion of the bag shaker rod 22 is provided by a connecting member 48 which has a bore 50 which receives the outer end portion of the bag shaker rod 22. Another roll pin 52 secures the outer end portion of the rod to the connecting member 48. The connecting member 48 is pivotally attached to the crank arm 44 by an integral stud 54 which projects from the connecting member 48 and passes through the slot 47. A flat washer 56 received on the outboard end of the stud 54 and a cotter pin 58 which passes through the stud outboard of the washer 56 maintains the connecting member in connected engagement with the crank arm 44, as best shown in FIG. 3.

Rocking motion is imparted to the rock shaft 42 by a manually operable rocker arm 60 centrally mounted on and welded or otherwise secured in fixed position to one end of the rock shaft 42 outboard of an associated sidewall 34, as best shown in FIG. 2. The rock shaft 42 is further secured against lateral movement relative to the mounting bracket 32 by an annular collar 63 secured to the opposite end of the rock shaft. A pair of handles 64,64, respectively connected to the extending opposite ends of the rocker arm 60 by sash chains 66,66, enable manual operation of the bag shaker 20.

Turning now to FIGS. 4-6, the previously described bag separator 10 is shown after the manually operated shaker operating mechanism 43 has been removed and the separator has been retrofitted with a power operated or motorized bag shaker, indicated generally by the numeral 68. In accordance with the present invention parts of the illustrated motorized bag shaker 68 are identical to parts of the manually operated bag shaker 20 previously described. Specifically, both the manual and the power operated shaker have in common the bag shaker rod 22, the shaker rod bushing assembly 28 mounted in the housing sidewall, the bushing seal 30, and the mounting bracket 32 secured to the housing sidewall externally of the housing 12.

The power operated bag shaker 68 has power driver shaker operating mechanism, indicated generally at 69, which essentially comprises a gearhead drive motor, indicated at 70, secured to the support bracket 32 by threaded fasteners which pass through the pre-drilled mounting holes 40,40, best shown in FIG. 3. The latter mounting holes, not utilized in connection with the manually operated shaker operating mechanism, previously described, facilitate rapid attachment of the drive motor 70 to the mounting bracket 32. The drive motor 70 which comprises a part of the power operated mechanism 68 is drivingly connected to the bag shaker rod 22 by a crank mechanism, indicated generally at 72, which includes a crank wheel 74 keyed to or otherwise mounted in fixed position to the output shaft of the drive motor 70 to rotate with it. The crank mechanism 72 further includes a connecting member 78 having a bore 80 which receives the extending free or outer end portion of the bag shaker rod 22 therein. The connecting member 78 is secured to the outer end portion of the rod 22 by a fastener, such as the illustrated roll pin 82 shown in FIGS. 4 and 5. A connecting rod 76 of adjustable length eccentrically connected to the crank wheel 74 and pivotally connected to the connecting member 78 imparts reciprocal movement to the bag shaker rod 22 to agitate the bag head 14 in response to operation of the drive motor 70. Preferably, and as shown, a protective cover or machine guard 84 covers the moving crank mechanism 72. The illustrated machine guard 84 is secured to the support bracket 32 by threaded fasteners which pass through the holes 41,41 in the opposing sidewalls 34,34. The washer 31 does not perform a function in the power operated bag shaker 68, because the adjustable connecting rod 76 positively limits the stroke of the bag shaker rod 22 so that the curved portion of the rod cannot enter the bushing assembly 28 and become jammed therein.

The use of separator parts common to both the manually operated and power operated bag shakers substantially simplifies bag separator manufacture and reduces parts inventory requirements. Since either type of mechanism may be readily installed on a basic bag separator, such as the separator 10, by a person having ordinary skill using basic hand tools, a customer may have the option of purchasing a bag separator equipped with a manually operated bag shaker operating mechanism with knowledge that the separator may be easily retrofitted for power operation at a later date, if so desired, and without modifying the separator structure.

I claim:

1. In a bag separator having a separator housing, a bag head horizontally disposed within the housing for supporting a plurality of filter bags depending therefrom, means supporting said bag head for horizontal movement within and relative to the separator housing, and a bag shaker for agitating the bag head to dislodge particulate material from the filter bags and including a bag shaker rod connected at its inner end to the bag head and extending axially outwardly through a wall of the bag housing and terminating at an outer end, and bushing assembly means for supporting the bag shaker rod for reciprocal axial sliding movement within the bushing assembly and relative to the housing, the improvement comprising a support bracket secured in fixed position to a sidewall of said separator housing, and shaker operating means for reciprocating said bag shaker rod and having a shaker operating mechanism selected from a group of interchangeable operating mechanisms including a manual operating mechanism and a power driven operating mechanism, each said operating mechanism in said group having a part for mounting on said support bracket to support said selected mechanism on said bag separator and a connecting member for operably attaching said selected operating mechanism to the outer end portion of said bag shaker rod to reciprocate said bag shaker rod in response to operation of said selected operating mechanism, said manual operating mechanism including an axially elongate rock shaft comprising said part and mounted on said support bracket for reciprocal axial movement about its axis and relative to said support bracket, a crank arm mounted in fixed position on said rock shaft for angular movement with said rock shaft, a link connecting said crank arm to said connecting member, and a manually operable rocker arm mounted in fixed position on said rock shaft, said power driven operating mechanism including a drive motor comprising said part and having a rotary output shaft, and a crank mechanism including a crank mounted in fixed position on said output shaft, and a connecting rod connected to said crank in eccentric relation to said output shaft and pivotally connected to said connecting member.

2. In a bag separator as set forth in claim 1 the further improvement wherein said support bracket has a generally U-shaped cross section as viewed from above and includes a pair of opposing side walls and a generally rectangular vertically disposed end wall integrally connected to and extending between said side walls, and defining a plurality of mounting holes for receiving mounting fasteners associated with said drive motor, said side walls defining a pair of shaft holes for receiving said rock shaft therethrough.

* * * * *